United States Patent Office
2,778,708
Patented Jan. 22, 1957

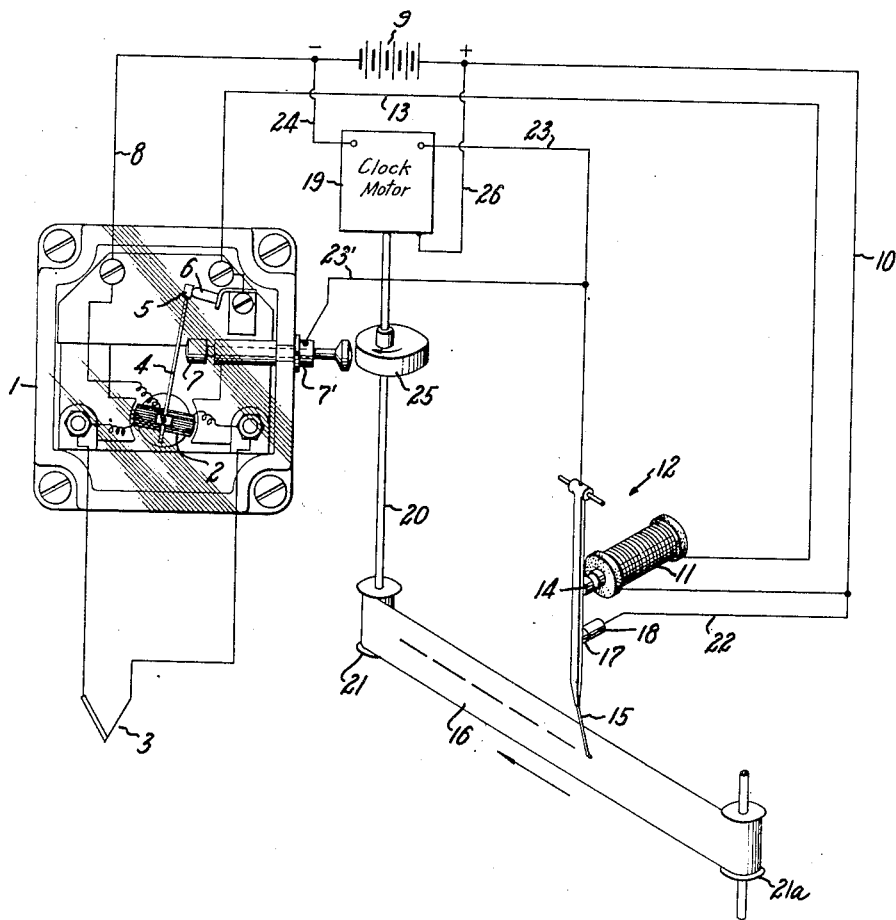

2,778,708

ELECTRICAL RECORDING APPARATUS

Anthony H. Lamb, Hillside, and Earl F. Adams, Union, N. J., assignors to Weston Electrical Instrument Corporation, Newark, N. J., a corporation of New Jersey Application June 29, 1953, Serial No. 364,876

2 Claims. (Cl. 346—74)

This invention relates to electrical recording apparatus, and more particularly to apparatus for recording the total elapsed time, either continuous or intermittent, during which an electrical quantity attained or exceeded a preselected value.

The electrical quantity may be a voltage or a current developed by and varying with the magnitude of a physical factor such as temperature, humidity, pressure, speed, etc. Apparatus for plotting a continuous record of the instantaneous variations in the magnitude of the measured factor is well known. In some instances, however, the desired information is not the magnitude of the measured factor at any given instant but the total time during which the magnitude exceeded or fell below a selected critical value. In the operation of turbojet engines, for example, it is necessary for the ground crew to know when, and for how long a period of time, the temperature of the exhaust gas exceeded a given critical value. It is the practice to rebuild certain parts of the engine after operation, either continuously or intermittently, at an excessive exhaust gas temperature for a certain total period of time. The total time of operation at the overtemperature can be derived from a continuous record of the exhaust gas temperature but only by the laborious process of checking charts which may cover many hours of operation of the engine.

An object of the present invention is to provide electrical apparatus for recording the total elapsed time during which a measured factor reached a selected critical value.

An object is to provide apparatus for measuring an electrical value which varies in magnitude with the temperature of a primary apparatus, and which includes a record strip that is moved and marked only during periods when the measured temperature attains or exceeds a preselected value, whereby the length of the marked record strip is a time integration of the period or periods of critical overtemperatures.

These and other objects and the advantages of the invention will be apparent from the following specification when taken with the accompanying drawing in which the single view is a schematic diagram of a portable electrical recording apparatus embodying the invention.

In the drawing, the numeral 1 identifies a sensitive magnetic contact relay of the type disclosed in Patent No. 2,565,312, Anthony H. Lamb, and reference is made to that patent for a detailed description of its construction and method of operation.

The moving system of the relay comprises a coil 2 across which a thermocouple 3 is connected, and a pointer or contact arm 4 having a soft iron contact 5 cooperating with a stationary permanent magnet contact 6. Good contact closures are obtained with the magnetic contacts but they must be separated mechanically by push rod 7 when once engaged as the springs, not shown, of the moving system are of insufficient strength to overcome the magnetic attraction.

The controlled circuit of the relay includes a lead 8 from the contact arm 4 to one terminal of a current source 9 which may be, and preferably is, a small battery such as employed in portable radios, a lead 10 from the opposite terminal of the current source to the coil 11 of a power relay 12, and a lead 13 from the coil 11 to the magnetic, stationary contact 6. The armature 14 of the power relay carries a stylus 15 which it presses into contact with a strip of recording paper 16 on energization of the power relay, and also a contact 17 which it engages with a stationary contact 18 to complete an energizing circuit for a small direct current motor 19 having a shaft 20 which is geared down to rotate at low speed, for example about two revolutions per minute, to drive the spool 21 to draw the record strip 16 from a supply spool 21a. The energizing circuit for the motor includes a jumper 22 from the relay contact 18 to the lead 10 and positive terminal of the battery 9, a lead 23 from the relay armature 14 to one terminal of the motor, and a lead 24 from the opposite motor terminal to the other side of the battery 9. The motor shaft 20 carries a cam 25 which engages the push rod 7 of the instrument relay 1 to separate the contacts 5 and 6, and the separation of the magnetic contacts de-energizes the power relay 12 but the electric motor 19 does not stop immediately as the cam and push rod 7 constitute a holding switch in parallel with the power relay contacts 17 and 18. The push rod 7 slides in a bushing 7' which is connected to the power relay armature 14 and contact 17 by a jumper wire 23', and a lead 26 from the positive terminal of the battery 9 is grounded on the casing of the motor 19, thereby establishing the battery potential on the cam 25.

All parts of the recorder except the thermocouple are preferably housed in a suitable box which may be located at any convenient space on the airplane. The thermocouple 3 is, of course, mounted in the exhaust nozzle of the engine and connected by appropriate leads to the moving coil 2 of the relay 1. The sensitivity of the relay 1 is such that the output of thermocouple 3 causes relay contacts 5 and 6 to close when the exhaust gas temperature reaches the preselected critical value.

Closure of the instrument relay contacts energizes the operating coil 11 of the power relay 12, and the armature 14 pulls in to depress the stylus 15 into engagement with the record strip 16. The record strip may be an abrasive-coated chart paper on which a stylus of soft metal such as silver, copper or aluminum scribes a dark line. The armature 14 also closes the contacts 17, 18 when it pulls in, and thus starts the motor 19 to drive the shaft 20 which advances the record strip 16. The rotation of the shaft 20 eventually brings the rise of cam 25 into engagement with the push rod to force the same inwardly to separate the magnetic contacts 5 and 6. This opens the energizing circuit of the power relay 12 and the armature 14 is released to lift the stylus 15 from the record strip 16. The circuit to the motor 19 remains closed for a short interval, however, so long as the cam 25 remains in sliding contact with the end of the push rod 7. The push rod 7 is urged toward the right by a spring, not shown, and the contact arm 4 follows it closely if the voltage generated by the thermocouple is still indicative of an overtemperature. Under this condition, the magnetic contacts close again before the cam 25 separates from the push rod 7, thereby maintaining continuous operation of the motor to repeat the recording cycle. If, however, the temperature at the thermocouple has dropped below the high critical value, the system stops when the cam 25 leaves the end of the push rod 7.

It will be noted that a broken line record is made even though the apparatus operates continuously over many operating cycles, since the power relay 12 is connected to the battery 9 only through the magnetic contacts and the armature 14 thus drops out during intervals when the magnetic contacts are separated, thereby lifting the stylus 15 from the record strip. One advantage of the broken line record lies in the fact that it is an indication that the apparatus is operating properly since a continuous record would result only in the event the sensitive relay contacts were not opened during such periods as the temperature of the thermocouple equalled or exceeded the predetermined, critical value. The motor 19 remains energized through the push rod 7 and cam 25 for an interval after the separation of the magnetic contacts, but does not overrun to any appreciable extent when de-energized since the motor is geared down to a very low shaft speed.

The apparatus is well adapted for installation on aircraft as the motor 19 is a miniature or "clock" motor which can be operated for several hours on a small battery of portable radio type. It will be noted that the current drain on the battery is limited to the periods of over-temperature during which a record is being made.

It should be noted, however, that the invention is not limited in its application to electrical recorders of relatively small size and weight, and that there is considerable latitude in the design and construction of the component elements of electrical recorders which come within the spirit and scope of the invention as set forth in the following claims.

Having now described our invention in accordance with the patent statutes which we desire to protect by Letters Patent of the United States is set forth in the following claims.

We claim:

1. Recording apparatus comprising means producing a voltage that varies in correspondence with changes in a variable condition; a sensitive relay having a movable coil motionally responsive to the said voltage, said movable coil carrying a movable contact adapted to engage a cooperating fixed contact when the said voltage exceeds a predetermined value; a power relay having an operating coil and a pair of normally-open contacts; a motor; a voltage source; circuit elements connecting the operating coil of the power relay across the said voltage source upon closure of the sensitive relay contacts; circuit elements connecting the motor across said voltage source upon closure of the contacts of the power relay; reset means to separate the movable contact of the sensitive relay from the cooperating fixed contact; means momentarily actuating the said reset means when the motor is energized; means maintaining the circuit from the motor to the voltage source closed during the period when said reset means is actuated to reset the sensitive relay contacts; normally stationary chart paper; means moving the chart paper during periods when the said motor is energized; a stylus normally spaced from a surface of the chart paper; and means bringing the stylus into contact with the chart paper during periods when the operating coil of the power relay is energized.

2. Recording apparatus comprising a sensing member producing a voltage that varies in magnitude with changes in a variable condition; a sensitive relay having a movable coil energized by said voltage, said movable coil carrying a movable contact of magnetic material adapted to engage a cooperating stationary contact of magnetic material when the magnitude of the voltage applied to the movable coil exceeds a predetermined value; a metal push rod slidably extending through a metal bushing and having an inner end adapted to engage the said movable contact of the sensitive relay, spring means biasing the push rod to a normal position wherein the inner end of the rod is spaced from the said movable contact; a motor having a rotatable shaft; a cam secured to the said shaft, said cam momentarily depressing the push rod upon rotation of said shaft thereby causing the inner end of the push rod to engage the said movable contact and disengage same from the cooperating stationary contact; chart paper in strip form carried by a rotatable supply spool and having an end secured to a drive spool that is rotated by the said shaft; a power relay having an operating coil and an armature carrying a first contact spaced from a fixed second contact; a stylus carried by the armature, said stylus being normally spaced from a surface of the chart paper and adapted to contact such surface upon energization of said power relay operating coil; a voltage source; leads connecting the operating coil of the power relay across said voltage source upon closure of the movable and stationary contacts of the sensitive relay; leads connecting the motor across the voltage source upon closure of the first and second contacts of the power relay; and leads connecting the said cam and metal bushing in series between one terminal of the voltage source and the armature of the power relay.

References Cited in the file of this patent

UNITED STATES PATENTS

| | | |
|---|---|---|
| 2,153,777 | Smart | Apr. 11, 1939 |
| 2,346,589 | Lamb | Apr. 11, 1944 |
| 2,515,314 | Pierce | July 18, 1950 |